US006922248B2

United States Patent
Steegmüller (10) Patent No.: US 6,922,248 B2
(45) Date of Patent: Jul. 26, 2005

(54) OPTOELECTRONIC COMPONENT FOR CONTACTLESS MEASUREMENT OF MOVEMENTS BETWEEN A MEASUREMENT OBJECT AND THE OPTOELECTRONIC COMPONENT

(75) Inventor: Ulrich Steegmüller, Regensburg (DE)

(73) Assignee: Osram GmbH, Munich (DE)

( * ) Notice: Subject to any disclaimer, the term of this patent is extended or adjusted under 35 U.S.C. 154(b) by 279 days.

(21) Appl. No.: 10/260,900

(22) Filed: Sep. 30, 2002

(65) Prior Publication Data

US 2003/0067608 A1 Apr. 10, 2003

(30) Foreign Application Priority Data

Sep. 28, 2001 (DE) ......................................... 101 47 987

(51) Int. Cl.⁷ ................................................ G01B 9/02
(52) U.S. Cl. ...................................... 356/496; 356/499
(58) Field of Search .............................. 356/28.5, 496, 356/498, 499, 500, 508, 521

(56) References Cited

U.S. PATENT DOCUMENTS 4,656,347 A * 4/1987 Une et al. .................... 250/548

FOREIGN PATENT DOCUMENTS

| DE | 245 480 A1 | 5/1987 |
| DE | 195 07 909 A1 | 9/1996 |
| DE | 196 17 880 A1 | 10/1996 |
| WO | WO 93/21820 | 11/1993 |
| WO | WO 99/46602 | 9/1999 |
| WO | WO 99/46603 | 9/1999 |

* cited by examiner

Primary Examiner—Gregory J. Toatley, Jr.
Assistant Examiner—Michael A. Lyons
(74) Attorney, Agent, or Firm—Laurence A. Greenberg; Werner H. Stemer; Ralph E. Locher (57) ABSTRACT

An optoelectronic component has a carrier body as well as an optoelectronic transmitter for emitting a coherent light beam and an optoelectronic receiver, which are applied on the carrier body. An optical device splits the light beam emitted by the optoelectronic transmitter into a reference beam and a measurement beam. The measurement beam reflected at the measurement object is received and superposed with the reference beam to form an interference beam. The interference beam is directed onto the optoelectronic receiver. The optoelectronic component furthermore contains a spacer, which is applied on the carrier body and on which the optical device is applied. The optical device is disposed parallel to and at a distance from the carrier body defined by the spacer.

19 Claims, 4 Drawing Sheets

OPTOELECTRONIC COMPONENT FOR CONTACTLESS MEASUREMENT OF MOVEMENTS BETWEEN A MEASUREMENT OBJECT AND THE OPTOELECTRONIC COMPONENT

BACKGROUND OF THE INVENTION

Field of the Invention

The invention relates to an optoelectronic component which is constructed for contactless measurement of one-dimensional or multidimensional translation movements between a measurement object and the optoelectronic component.

Possible applications of such optoelectronic components are, for example, the distance and speed determination of linear and multidimensional feeds, for example in machine tools, robots, encoders and the like, and input devices for computers, mobile radio telephones and mobile Personal Digital Assistants (PDAs).

In practice, a variety of optical measurement methods and systems exist for the measurements of relative movements between a measuring device and an object. They can be roughly divided into interferometric measurement methods, autocorrelation measurements, laser Doppler anemometry, propagation time measurements of pulses and encoders.

In the case of the first-mentioned interferrometric measurements, two spatially separate coherent partial beams, a measurement beam and a reference beam, are generated through the use of beam splitting and are combined again after traversing a predetermined optical path and are superposed in an interfering manner in the process. Conclusions about the optical and thus also the geometrical path differences of the two partial beams can be drawn from intensity distributions resulting from the interference. A distance or speed determination can be effected by taking up and evaluating the interference signal over a specific period of time.

An interferrometric system which can be used to detect both the magnitude and the direction of a translation movement between a measuring device and an object surface is described, for example, in International Publication No. WO-A-99/46602 and the further development thereof in International Publication No. WO-A-99/46603.

In the case of the measurement system disclosed in those documents, the surface of a moving measurement object is irradiated with a coherent light source and a partly reflecting optical grating is positioned between the light source and the surface in proximity to the surface parallel to the latter. Therefore, one part of the incident light is reflected by the grating to a detector (reference beam), while the other part of the incident light passes through the grating to the surface of the moving object and is reflected at that surface (measurement beam), in order to be superposed with the reference beam. The detector acquires a periodic measurement signal from the interference of the two partial beams. It is possible to determine the magnitude of the relative movement between the measuring device and the object parallel to the object surface from the frequency of the signal. In order to be able to determine not only the magnitude of the relative movement but also the direction of movement, a phase shift is additionally generated between the two partial beams, and the direction of the relative movement can be inferred from the sign of that phase shift.

In the case of autocorrelation measurements, the moving surface of an object is illuminated by a light source and the reflected light is taken up by an areal spatially resolving detector. The direction of movement and the speed can be inferred from the evaluation of a plurality of successively received images of the reflected light through the use of an autocorrelation analysis of the intensity patterns. In the case of an incoherent light source, a texture of the moving surface is generally necessary in order to obtain a sufficiently high contrast in the reflected light pattern. In the case of coherent irradiation through the use of a laser diode, for example, so-called speckle patterns resulting from the reflection at surface roughnesses can be used for the evaluation.

In order to provide laser Doppler anemometry, a laser beam is split and the two partial beams are brought to interference at a specific position. If a scattering object, such as a rough surface, for example, passes the region of resulting interference fringes, then a part of the light is scattered onto a detector. The signal measured at the detector varies with the intensity of the interference pattern at the position of the scattering object. The frequency of the signal variation effected by a moving object is thus proportional to the speed of the scattering object and can therefore be used for distance measurement.

A further possibility for optically determining a distance or a change in distance is the propagation time measurement of light pulses which are reflected at the surface of the moving object. If that propagation time measurement is carried out repeatedly over a specific period of time, then it is possible to determine the relative movement of the object to or away from the detector.

The term encoder is understood to encompass angle encoding or length encoding devices in which the imaging of a moving strip pattern on detector elements is used to determine the angle or the distance. In that case, an incoherent light source is used to illuminate a code strip or code wheel which is connected to the moving object and has narrow light gaps. With a suitable, usually multiple, photodiode configuration, the movement of a light/shadow pattern generates a periodic current-time profile which can be evaluated by an electronic counting unit. Reflection-based and transmission-based encoders exist which are suitable for low to high-resolution applications.

Conventional sensors which operate contactlessly and are based on the measurement methods described above are usually constructed in such a way that separately produced optical components are placed onto standard housings for optoelectronic components. During individual mounting the optical components must be adjusted very precisely with respect to the optoelectronic devices, in order to be able to obtain the required measurement accuracies. The sensors known heretofore do not achieve the reliability required for use in a critical environment (e.g. the automobile industry) and have relatively large form factors, which is unfavorable particularly for use as a computer/PDA input device.

SUMMARY OF THE INVENTION

It is accordingly an object of the invention to provide an optoelectronic component, which overcomes the hereinafore-mentioned disadvantages of the heretofore-known devices of this general type, which can be used as a sensor for detecting one-dimensional and multidimensional translation movements and which has a high reliability and measurement accuracy even in critical environments.

With the foregoing and other objects in view there is provided, in accordance with the invention, an optoelectronic component, comprising a carrier body. An optoelectronic transmitter is disposed on the carrier body for emitting a coherent light beam and an optoelectronic receiver is disposed on the carrier body. An optical device is provided for splitting the light beam emitted by the optoelectronic transmitter into a reference beam and a measurement beam. The measurement beam is radiated in the direction of a measurement object and reflected at the measurement object. The optical device receives the reflected measurement beam and superposes the reflected measurement beam with the reference beam to form an interference beam. The optical device directs the interference beam onto the optoelectronic receiver. A spacer is disposed between the carrier body and the optical device and defines a distance between the optical device and the carrier body.

With the objects of the invention in view, there is also provided an optoelectronic component, comprising a carrier body, an optoelectronic transmitter for emitting a coherent light beam and an optoelectronic receiver. An optical device splits the light beam emitted by the optoelectronic transmitter into a reference beam and a measurement beam. The measurement beam is radiated in the direction of a measurement object and reflected at the measurement object. The optical device receives the reflected measurement beam and superposes the reflected measurement beam with the reference beam to form an interference beam. The optical device directs the interference beam onto the optoelectronic receiver. A spacer is disposed between the carrier body and the optical device for spacing the optical device apart from the carrier body. The optoelectronic transmitter, the optoelectronic receiver and the spacer are disposed on the carrier body for directing the light beam emitted by the optoelectronic transmitter on the carrier body into the optical device on the spacer and for directing the interference beam from the optical device to the optoelectronic receiver on the carrier body.

The micro-optical and optoelectronic elements of the optoelectronic component are applied in an integrated construction directly on a detector chip serving as a carrier body. Therefore, a very small and robust sensor with high measurement accuracy can be provided. Moreover, the spacer between the carrier body with the optoelectronic elements and the optical device obviates the mutual adjustment in the z-direction, so that as a result thereof, as compared with conventional sensors, a mounting tolerance is obviated. A further mounting tolerance is obviated by virtue of the fact that the transmitter and the receiver are mounted on the same carrier body.

In accordance with another feature of the invention, the spacer being used is a deflection prism which deflects the light beam emitted by the optoelectronic transmitter in the direction of the optical device.

In accordance with a further feature of the invention, in order to detect both the magnitude and the direction of a movement of the measurement object relative to the optoelectronic component, the optical device has a partly reflecting diffraction grating for generating the reference beam, a circular polarizer for generating a circularly polarized, reflected measurement beam, a beam splitter for splitting the interference beams in each case into two partial beams, and a phase difference generating device upstream of the optoelectronic receiver for generating a phase difference between the partial beams. Through the use of this configuration, the speed of movement of the measurement object relative to the component can be determined from the frequency of the amplitude changes of the interference beams and the direction of movement of the measurement object relative to the component can be determined from the sign of the phase difference between the partial beams.

In accordance with an added feature of the invention, the optoelectronic transmitter, the optoelectronic receiver and the spacer are disposed on the carrier body in such a way that the light beam emitted by the optoelectronic transmitter on the carrier body passes into the optical device spaced apart from the carrier body by the spacer and the interference beam passes from the optical device to the optoelectronic receiver on the carrier body.

With the objects of the invention in view, there is also provided a writing recognition system, comprising the optoelectronic component. The writing recognition system may further comprise a reading wand having a tip in which the component is incorporated.

Other features which are considered as characteristic for the invention are set forth in the appended claims.

Although the invention is illustrated and described herein as embodied in an optoelectronic component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Referring now to the figures of the drawings in detail and first, particularly, to FIGS. 1–4 thereof, there is seen a first exemplary embodiment of the present invention which is described in detail with reference thereto. Alternative embodiments of the optoelectronic component are illustrated in FIGS. 5 to 8.

An optoelectronic component 10 according to the present invention can advantageously be used as a sensor for contactless detection of one-dimensional or multidimensional translation movements between the component 10 and a measurement object 12. In this case, it is possible to determine not only the speed but also the direction of the relative movement.

The optoelectronic component 10 substantially includes a carrier body 14, such as a silicon carrier, for example, on which various optoelectronic components 16, 20 are mounted, and an optical device 30 with a plurality of optical components.

Figure 1:
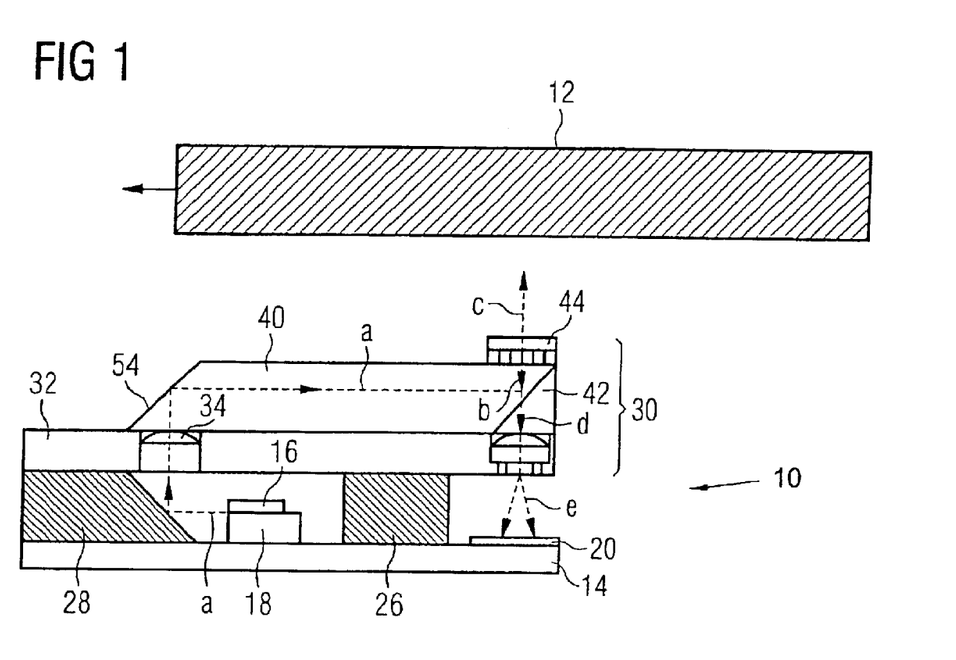
FIG. 1 is a diagrammatic, sectional view of an optoelectronic component in accordance with a first preferred exemplary embodiment of the present invention.
Figure 2A:
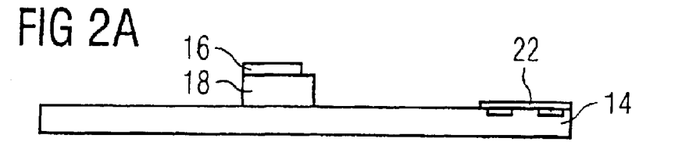
FIGS. 2A and 2B are respective enlarged, side-elevational and plan views of a carrier body with optoelectronic elements of the optoelectronic component of FIG. 1.
Figure 2B:
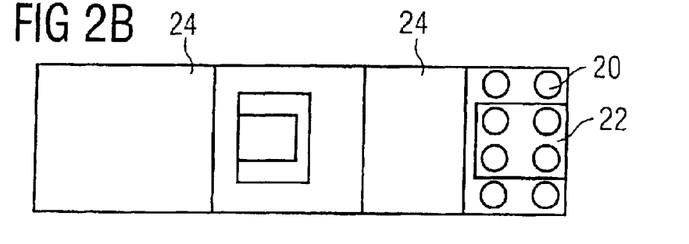

As can be seen from FIGS. 1, 2A and 2B, a coherent light source such as, for example, a laser diode or a single-mode VCSEL (Vertical Cavity Surface Emitting Laser) is mounted as the optoelectronic transmitter 16 on the carrier body 14, directly or through an adapter 18. The laser diode 16 can be fixedly connected to the silicon carrier, for example, through the use of adhesive bonding, eutectic bonding or anodic bonding. Moreover, a plurality of photodiodes are integrated as the optoelectronic receiver 20 in the carrier body 14. As an alternative, the photodiodes may be mounted as discrete components on the carrier body. The photodiodes 20, which total eight photodiodes in the illustrated exemplary embodiment, are fabricated in accordance with the standard technologies of the semiconductor industry on the wafer scale. Since the optoelectronic transmitter 16 and the optoelectronic receiver 20 are mounted on a common carrier body 14, one of the mounting tolerances is obviated as compared with separate incorporation.

As is illustrated in particular in FIG. 2B, a phase difference generating device 22 is situated on the middle four of the total of eight photodiodes 20. The device 22 includes, for example, a cholesteric layer and a phase delay layer or a linear polarizer. The method of operation of the device 22 is explained in more detail below in connection with the method of operation of the entire optoelectronic component.

Furthermore, two bonding areas 24 are provided on the carrier body 14. An adapter 26 made of glass and a deflection prism 28 made of glass are placed onto the bonding areas. In the illustrated exemplary embodiment, both the adapter 26 and the deflection prism 28 serve as spacers and their common height defines a distance between the carrier body (and thus the optoelectronic components) and the optical device 30, which is described further below.

The deflection prism 28 is highly reflective for the wavelength used for the laser diode 16 (such as 650 nm). For example, it may be correspondingly coated, so that a coherent light beam identified by reference symbol a emitted by the laser diode 16 parallel to the surface of the carrier body 14 is deflected in the direction of the optical device 30, i.e. upward in FIG. 1.

The glass adapter and prism or bars 26, 28 can be produced as long strips and coated, if appropriate. The strips are separated after being joined to the bonding areas 24 of the carrier body 14. This procedure allows high-precision mounting of the glass adapter and prism 26, 28.

The optical device 30 is applied on the spacers 26, 28. The optical device substantially includes a first optical element 32, which is disposed directly on the spacers 26, 28, a second optical element 40 on the first optical element 32 and a third optical element 44 on that side of the second optical element 40 which faces the measurement object 12.

Figure 3A:
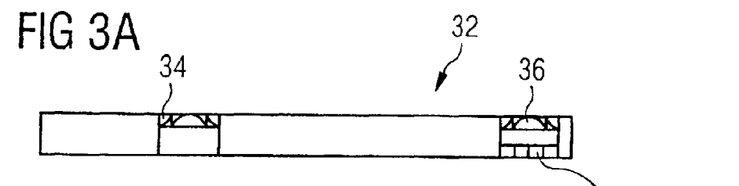
FIGS. 3A and 3B are respective enlarged, side-elevational and plan views of a first optical element of an optical device of the optoelectronic component of FIG. 1.
Figure 3B:
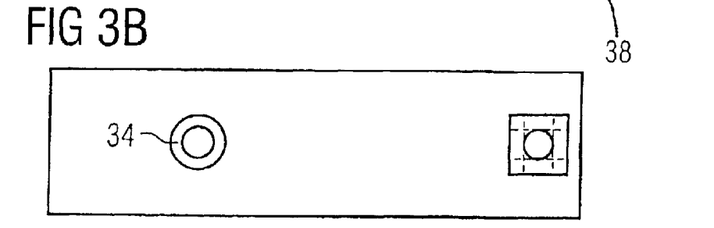

As is shown in an enlarged illustration in FIGS. 3A and 3B, the first optical element 32 contains a collimator lens 34, through which the light beam a that is emitted by the laser diode 16 and deflected by the deflection prism 28 is directed in parallel. Furthermore, the first optical element 32 contains a focusing lens 36, downstream of which a 1×2 beam splitter 38 is connected. The focusing lens 36 is intended to focus interference beams d onto the photodiodes 20 on the silicon carrier 14, and the 1×2 beam splitter 38 splits each interference beam d into two partial beams e, as is shown in FIG. 1 and described in more detail below in connection with the method of operation of the optoelectronic component.

The first optical element 32 of the optical device 30 is produced from customary optical materials such as glass or plastic. The collimator lens 34 and the focusing lens 36 may have a refractive and/or diffractive construction. The 1×2 beam splitter 38 is, for example, a diffractive element such as, for example, a binary beam splitter grating. The lenses 34, 36 in the first optical element 32 can be produced, for example, through the use of etching methods or plastic embossing or plastic injection-molding technologies.

The second optical element 40 of the optical device 30, which element is provided directly on the first optical element 32, contains a deflection element 54 and a beam splitter 42. The deflection element 54 is formed by a highly reflecting coating on a 45° edge of the second optical element 40. The beam splitter 42 reflects about 50% of the incident light and transmits the remaining proportion in both directions. The second optical element 40 is aligned with regard to the first optical element 32 in such a way that the deflection element 54 is disposed above the collimator lens 34 and the beam splitter 42 is disposed above the focusing lens 36 and the beam splitter 38.

The third optical element 44 of the optical device 30 is situated on that side of the second optical element 40 which faces the measurement object 12. The optical axis of the third optical element 44 lies on the optical axis of the focusing lens or optic 36 of the first optical element 32.

Figure 4:
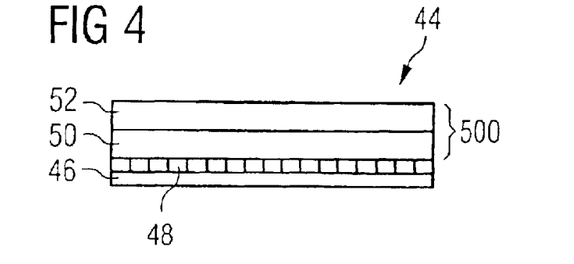
FIG. 4 is an enlarged, side-elevational view of a third optical element of the optical device of the optoelectronic component of FIG. 1.

As is illustrated in FIG. 4, the third optical element 44 substantially includes a substrate layer 46, which faces the optical element 40, a partly reflecting diffraction grating 48 and a circular polarizer 500.

The partly reflecting diffraction grating 48 has, for example, a periodic surface profile in the x-direction and in the y-direction on the substrate layer 46. A partly reflecting layer, for example including a thin metal layer or a dielectric interference layer is provided on the surface profile, in order to reflect a part of the incident light beam a and split it into a plurality of orders of diffraction. Preferably, the incident light beam a is split only into four reflected reference beams b in each case of the first order of diffraction. The other orders of diffraction are to be avoided for energy reasons and for the purpose of suppressing disturbing scattered light. In each case, the orders of diffraction being generated also have, in addition to their main propagation component in the z-direction, a propagation component in the ±x-direction and in the ±y-direction. Since the grating effect of the diffraction grating 48 is intended to be cancelled for transmitted light of the measurement beam c, the surface profile which is coated in a partly reflecting manner is leveled, for example, with a material having an optical refractive index which is adapted to that of the grating material. This material simultaneously serves as an adhesive bonding agent to the adjoining circular polarizer.

The circular polarizer has, for example, a phase delay plate 50, such as a λ/4 plate, for example, and a linear polarizer 52. Preferred axes of the two elements 50, 52 are rotated by 45° with respect to one another. Examples of materials that can be used for the circular polarizer are phase delay and linear polarizer films based on mechanically stretched organic polymers or else cholesteric polymer layers or Polarcor layers. The method of operation of this circular polarizer is likewise explained in more detail in the description of the functioning of the optoelectronic component 10.

In order to protect the third optical element 44 against mechanical damage, a non-illustrated coating made of a transparent, mechanically insensitive material may be provided on the side facing the measurement object 12, i.e. on the circular polarizer.

The method of operation of the optoelectronic component 10 described above and the thus possible measurement of translation movements between the component 10 and the measurement object 12 will now be described in more detail.

The laser diode 16 firstly emits a coherent light beam a with a wavelength of 650 nm, for example, in a direction parallel to the surface of the carrier body 14, as is illustrated in FIG. 1. This light beam a is deflected at the deflection prism 28 which is fixed on the carrier body 14, by 90° in a direction perpendicular to the surface of the carrier body 14 and in the direction of the optical device 30. In the optical device 30, this deflected light beam a is firstly directed parallel through the collimator lens 34 of the first optical element 32 and deflected at the deflection element 54 of the second optical element 40 by 90° in a direction parallel to the surface of the carrier body 14. The light beam a now propagating in the second optical element 40 then impinges on the beam splitter 42 of the second optical element 40, which deflects about 50% of the incident light by 90° in the direction toward the third optical element 44 and the measurement object 12 (upward in FIG. 1).

Next, this light beam a impinges on the third optical element 44. At the partly reflecting diffraction grating 48 of the third optical element 44, a part of the impinging light a is reflected and the reflected portion is split into four reference beams b in each case of the first order of diffraction due to the grating effect of the diffraction grating 48. As already mentioned, in each case, these four reference beams b also have, in addition to their main propagation component in the z-direction, a propagation component in the ±x-direction and in the ±y-direction.

The nonreflected portion of the light beam a incident on the diffraction grating 48 is transmitted without being split into the different orders of diffraction and, after passing through the circular polarizer 50, 52, impinges as the measurement beam c on the surface of the measurement object 12. The measurement beam c is scattered and reflected back at the surface of the measurement object 12. A part of the backscattered measurement beam c passes through the circular polarizer 52, 50 again, as a result of which a circular polarization state of the scattered measurement beam c is obtained.

The backscattered measurement beam c transmitted through the third optical element 44 with the circular polarizer 50, 52 and the diffraction grating 48 is superposed with the reference beams b reflected into different orders of diffraction at the diffraction grating 48. The four interference beams d thus produced subsequently impinge on the beam splitter 42 of the second optical element 40, where about 50% of the impinging light is transmitted.

Next, the interference beams d impinge on the focusing lens 36 of the first optical element 32, with the aid of which lens the interference beams d are focused onto the photodiodes 20 on the silicon carrier 14. The 1×2 beam splitter 38 provided directly behind the focusing lens 36 in each case splits the focused interference beams d into two partial beams e. In the present case, then, each of the four interference beams d is split into two partial beams, so that a total of eight partial beams e are produced which are each focused onto a respective one of the photodiodes 20, of which likewise a total of eight are provided, as is illustrated in FIG. 2B.

As was already mentioned, a phase difference generating device 22 is provided before the middle four of the eight photodiodes 20, as seen from the measurement object, in order to be able to determine not only the magnitude of the movement speed but also the sign of the direction of movement. The polarization state of the linearly polarized reference light b is not influenced by the phase delay layer of the phase difference generating device 22, while the circularly polarized scattered light c is converted into linearly polarized light having a polarization vector which is rotated by ±45° relative to the polarization vector of the reference light b. The cholesteric layer of the phase difference generating device 22 acts as a circular polarizer which makes circularly polarized light from linearly polarized reference light b and linearly polarized scattered light c. Consequently, through the use of this device 22, in each case one of the two partial beams e which exist for each of the four interference beams will experience a phase shift of +45° or −45°. As an alternative, it is also possible for all of the photodiodes 22 to be provided with the phase difference generating device 22, so that phase shifts of +90° or −90° are generated, which can be detected more easily by an evaluation circuit 56 that is described below.

Linear polarizers can equally be used as the phase difference generating device. In this case, the polarization direction of the linear polarizer is below 45° with respect to the polarization direction of the reference beam.

It is thus possible to detect the relative movement of the measurement object 12 with respect to the optoelectronic component 10 both with regard to its speed (from the frequency of the amplitude change) and with regard to its direction of movement (from the sign of the phase difference) in the x and y-directions.

Electrical measurement signals generated by the photodiodes 20 are fed, if appropriate after amplification by suitable electronic amplifiers, to the evaluation circuit 56, for example in the form of an ASIC.

The optoelectronic component 10 described above can thus advantageously be used as a sensor for detecting one-dimensional and multidimensional translation movements between a measurement object 12 and the component 10. In this case, the optoelectronic component 10 according to the invention is distinguished by its compact construction which, due to the integrated construction of optical and optoelectronic components, additionally ensures a high measurement accuracy and reliability since some mounting tolerances of conventional sensors are avoided during production.

In particular, mounting tolerances which are customary in the case of conventional sensors are avoided by the use of a common carrier body 14 for the optoelectronic components, namely the transmitter 16 and the receiver 20, as well as the precise positioning, defined by a spacer 26, 28, of the optical device 30 relative to the carrier body 14 and thus the optoelectronic components 16, 20.

While the present invention has been explained in detail above using a preferred exemplary embodiment, it goes without saying that variations or modifications of the optoelectronic component are conceivable without departing from the underlying technical teaching according to the invention.

Figure 5:
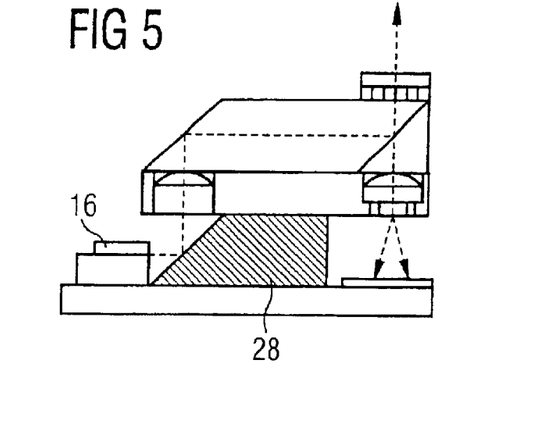
FIG. 5 is a partly-sectional, perspective view of an optoelectronic component in accordance with a second exemplary embodiment of the present invention.

By way of example, it is possible to dispense with the adapter 26 as a spacer, as is the case in the exemplary embodiment of FIG. 5. In this case, the deflection prism 28 exclusively serves as a spacer and, with its height, defines the distance between the optoelectronic components 16, 20 on the common carrier body 14 and the optical device 30. In order to ensure a stable construction of the optoelectronic component 10, the deflection prism 28 in this case is preferably positioned between the optoelectronic transmitter 16 and receiver 20.

Figure 6:
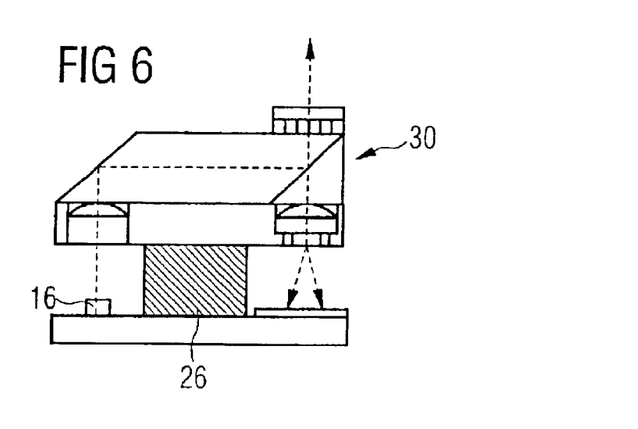
FIG. 6 is a view similar to FIG. 5 of an optoelectronic component in accordance with a third exemplary embodiment of the present invention.

In contrast, the deflection prism 28 is dispensed with in a further variant of the invention illustrated in FIG. 6. In this case, the adapter 26 made of glass exclusively serves as a spacer. The optoelectronic transmitter 16 in this case is disposed on the carrier body 14 in such a way that it emits the coherent light beam a directly in the direction of the collimator lens 34 of the optical device 30, so that beam deflection as in the embodiments of FIGS. 1 and 5 is not necessary.

Figure 7:
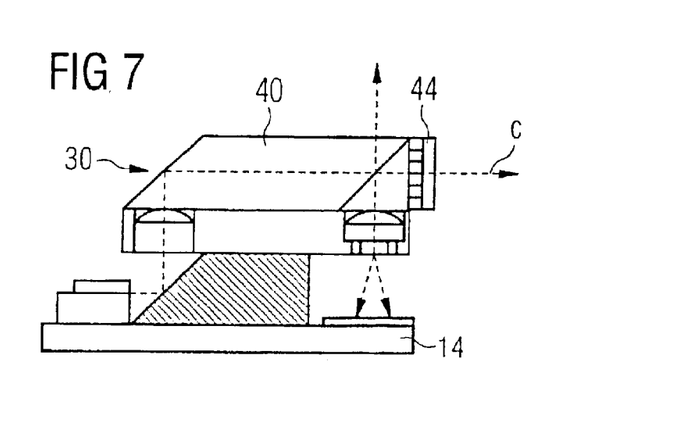
FIG. 7 is a view similar to FIGS. 5 and 6 of an optoelectronic component in accordance with a fourth exemplary embodiment of the present invention.

In the fourth exemplary embodiment of the invention illustrated in FIG. 7, the adapter 26 was dispensed with as a spacer, as in the second exemplary embodiment shown in FIG. 5. However, in contrast to the above-described embodiments, in this case the third optical element 44 of the optical device 30 is not provided on that side of the optical device 30 which is remote from the carrier body 14, but rather is fitted to the end of the second optical element 40. The measurement beam c which passes through the third optical element 44 is thus radiated in a direction parallel to the surface of the carrier body 14.

Figure 9:
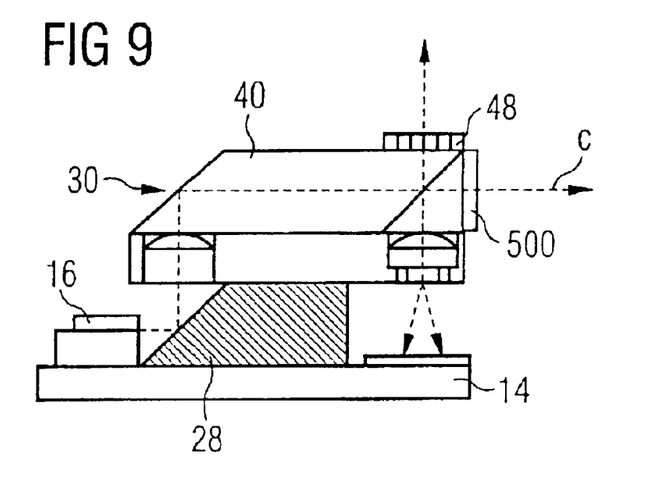
FIG. 9 is a view similar to FIGS. 5, 6, 7 and 8 of an optoelectronic component in accordance with a sixth exemplary embodiment of the present invention.

In the exemplary embodiment of the invention illustrated in FIG. 9, the adapter 26 was dispensed with as a spacer, as in the second exemplary embodiment shown in FIG. 5. In contrast to the embodiment of FIG. 7, in this case the diffraction grating 48 is provided on that side of the optical device 30 which is remote from the carrier body 14, and in this case the diffraction grating 48 acts only in reflection. The polarizer 500 is situated at the end of the second optical element 40. The measurement beam c which passes through the third optical element 44 is radiated in a direction parallel to the surface of the carrier body 14. In this case, the diffraction grating can advantageously return a significantly higher power and, at the same time, concomitantly utilize the other 50% power of the beam splitter 42 that is otherwise rejected. In this case, the beam toward the moving area passes only through the circular polarizer. This system is advantageously very efficient and economical with the available laser power.

Figure 8:
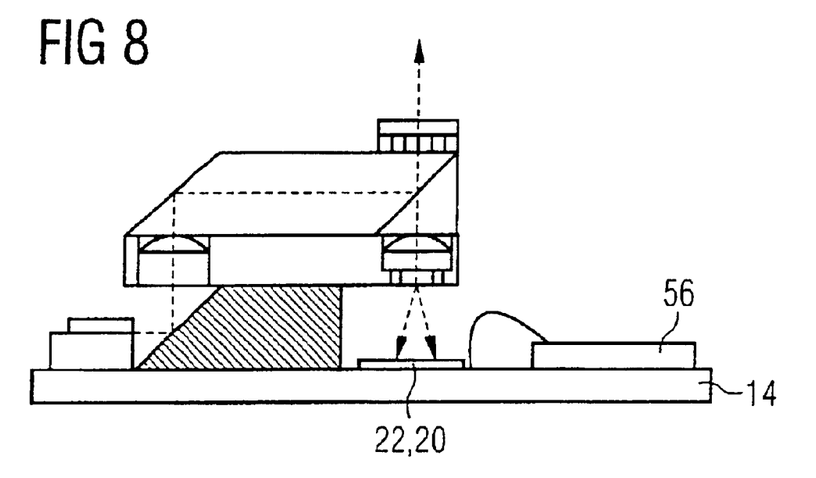
FIG. 8 is a view similar to FIGS. 5, 6 and 7 of an optoelectronic component in accordance with a fifth exemplary embodiment of the present invention.

Furthermore, it is also possible for the evaluation circuit 56 for evaluating the electrical measurement signals of the photodiodes 22 to likewise be provided on the carrier body 14 as is seen in FIG. 8. Such an evaluation circuit 56 contains various analog and digital assemblies in order to generate digital output signals from the electrical current-time measurement signals that are proportional to the movement of the measurement object 12. The output signals can be used to determine the speed and the direction of movement of the translation movements of the measurement object 12 relative to the optoelectronic component 10.

In a cost-effective variant of the component, a diode laser with a wavelength of about 780 nm is advantageously used. When using a vertical cavity surface emitting laser (VCSEL), a wavelength of 850 nm is preferably used.

Moreover, the carrier body 14 can be mounted cost-effectively and in a technically simple manner onto a printed circuit board (PCB) or onto a leadframe.

Furthermore, circuits and the photodiodes 20 may already be integrated into the carrier body 14 itself, for example by using BiCMOS technology.

In the case of this component, the optoelectronic transmitter 16, the optoelectronic receiver 20 and the spacer 26, 28 are advantageously disposed on the carrier body 14 in such a way that the light beam emitted by the optoelectronic transmitter on the carrier body passes into the optical device spaced apart from the carrier body by the spacer and the interference beam passes from the optical device to the optoelectronic receiver on the carrier body.

I claim:

1. An optoelectronic component, comprising:

a carrier body;

an optoelectronic transmitter disposed on said carrier body for emitting a coherent light beam and an optoelectronic receiver disposed on said carrier body;

an optical device for splitting the light beam emitted by said optoelectronic transmitter into a reference beam and a measurement beam, the measurement beam being radiated in the direction of a measurement object and reflected at the measurement object, said optical device receiving the reflected measurement beam and superposing the reflected measurement beam with the reference beam to form an interference beam, and said optical device directing the interference beam onto said optoelectronic receiver; and a spacer disposed between said carrier body and said optical device, said spacer defining a distance between said optical device and said carrier body.

2. The optoelectronic component according to claim 1, wherein said spacer is a deflection prism deflecting the light beam emitted by said optoelectronic transmitter in the direction of said optical device.

3. The optoelectronic component according to claim 1, which further comprises an evaluation circuit disposed on said carrier body and connected to said optoelectronic receiver.

4. The optoelectronic component according to claim 1, wherein said optical receiver has a plurality of photodiodes.

5. The optoelectronic component according to claim 1, wherein said optical device has a focusing device for focusing the interference beam onto said optoelectronic receiver.

6. The optoelectronic component according to claim 1, wherein said optical device has a partly reflecting diffraction grating for generating the reference beam and a circular polarizer for generating the circularly polarized, reflected measurement beam.

7. The optoelectronic component according to claim 6, wherein said partly reflecting diffraction grating produces four reflected reference beams of the first order of diffraction.

8. The optoelectronic component according to claim 6, wherein said optical device has a beam splitter for splitting each of the interference beams into two partial beams, and said optical device has a phase difference generating device upstream of said optoelectronic receiver for generating a phase difference between the partial beams to determine a speed of movement of the measurement object relative to the optoelectronic component from a frequency of amplitude changes of the interference beams and a direction of movement of the measurement object relative to the optoelectronic component from a sign of a phase difference between the partial beams.

9. The optoelectronic component according to claim 8, wherein said diffraction grating and said polarizer are disposed at different locations of said beam splitter, said diffraction grating acts exclusively in reflection and the measurement beam runs only through said polarizer.

10. An optoelectronic component, comprising:
a carrier body;
an optoelectronic transmitter for emitting a coherent light beam and an optoelectronic receiver;
an optical device for splitting the light beam emitted by said optoelectronic transmitter into a reference beam and a measurement beam, the measurement beam being radiated in the direction of a measurement object and reflected at the measurement object, said optical device receiving the reflected measurement beam and superposing the reflected measurement beam with the reference beam to form an interference beam, and said optical device directing the interference beam onto said optoelectronic receiver; and
a spacer disposed between said carrier body and said optical device for spacing said optical device apart from said carrier body;
said optoelectronic transmitter, said optoelectronic receiver and said spacer disposed on said carrier body for directing the light beam emitted by said optoelectronic transmitter on said carrier body into said optical device on said spacer and for directing the interference beam from said optical device to said optoelectronic receiver on said carrier body.

11. The optoelectronic component according to claim 10, wherein said carrier body is a semiconductor carrier and said optoelectronic receiver is integrated in said semiconductor carrier.

12. A The optoelectronic component according to claim 10, wherein said spacer is a deflection prism deflecting the light beam emitted by said optoelectronic transmitter in the direction of said optical device.

13. The optoelectronic component according to claim 10, which further comprises an evaluation circuit disposed on said carrier body and connected to said optoelectronic receiver.

14. The optoelectronic component according to claim 10, wherein said optical receiver has a plurality of photodiodes.

15. The optoelectronic component according to claim 10, wherein said optical device has a focusing device for focusing the interference beam onto said optoelectronic receiver.

16. The optoelectronic component according to claim 10, wherein said optical device has a partly reflecting diffraction grating for generating the reference beam and a circular polarizer for generating the circularly polarized, reflected measurement beam.

17. The optoelectronic component according to claim 16, wherein said partly reflecting diffraction grating produces four reflected reference beams of the first order of diffraction.

18. The optoelectronic component according to claim 16, wherein said optical device has a beam splitter for splitting each of the interference beams into two partial beams and a phase difference generating device upstream of said optoelectronic receiver for generating a phase difference between the partial beams to determine a speed of movement of the measurement object relative to the optoelectronic component from a frequency of amplitude changes of the interference beams and a direction of movement of the measurement object relative to the optoelectronic component from a sign of a phase difference between the partial beams.

19. The optoelectronic component according to claim 18, wherein said diffraction grating and said polarizer are disposed at different locations of said beam splitter, said diffraction grating acts exclusively in reflection and the measurement beam runs only through said polarizer.

* * * * *